(12) United States Patent
Suto et al.

(10) Patent No.: US 12,165,224 B2
(45) Date of Patent: Dec. 10, 2024

(54) ELECTRIC VEHICLE CHARGING RESERVATION TIMESLOT REALLOCATION

(71) Applicant: KYNDRYL, INC., New York, NY (US)

(72) Inventors: Tiberiu Suto, Franklin, NY (US); Shikhar Kwatra, San Jose, CA (US); Vinod A. Valecha, Pune (IN); Sachin S. Patwardhan, Kothrud (IN)

(73) Assignee: KYNDRYL, INC., New York, NY (US)

( * ) Notice: Subject to any disclaimer, the term of this patent is extended or adjusted under 35 U.S.C. 154(b) by 549 days.

(21) Appl. No.: 17/643,671

(22) Filed: Dec. 10, 2021

(65) Prior Publication Data

US 2023/0182608 A1    Jun. 15, 2023

(51) Int. Cl.
*G06Q 50/06* (2024.01)
*B60L 53/66* (2019.01)
*G06Q 10/02* (2012.01)

(52) U.S. Cl.
CPC .......... *G06Q 50/06* (2013.01); *B60L 53/665* (2019.02); *G06Q 10/02* (2013.01); *B60L 2240/72* (2013.01); *B60L 2240/80* (2013.01)

(58) Field of Classification Search
CPC .................................................. G06Q 50/06
(Continued)

(56) References Cited

U.S. PATENT DOCUMENTS 7,991,665 B2   8/2011   Hafner et al.
9,766,671 B2   9/2017   Dorn et al.
(Continued)

FOREIGN PATENT DOCUMENTS

JP    6129701 B2    5/2017
KR    20180010375 A    1/2018

OTHER PUBLICATIONS

Ren, H., et al., "Optimal Scheduling of an EV Aggregator for Demand Response Considering Triple Level Benefits of Three-Parties", 21 pgs.

Chen et al.; "Electric Vehicle Charging Schedule Considering User's Charging Selection From Economics", IET Gener. Transm. Distrib., 2019, vol. 13 Iss. 15, pp. 3388-3396.

(Continued)

*Primary Examiner* — Jerry D Robbins
(74) *Attorney, Agent, or Firm* — Erik Swanson; Andrew M. Calderon; Calderon Safran & Wright P.C.

(57) ABSTRACT

Electric vehicle charging reservation timeslot reallocation includes determining, in connection with an electric vehicle (EV) traveling to a destination, arrival parameters of the EV to arrive at the destination and a charging requirement of the EV to reach the destination within the arrival parameters, identifying reserved charging reservation timeslot(s) at EV charging station(s) along a route to the destination that satisfy the arrival parameters and charging requirement of the EV, determining, using an AI model configured to determine reallocations of charging reservations at electric vehicle charging stations, a proposed reallocation of a reserved charging reservation timeslot of the reserved charging reservation timeslot(s), the reserved charging reservation timeslot owned by an entity, and the proposed reallocation comprising a proposal for the entity to give up at least a portion of the reserved charging reservation timeslot to charge the EV, and electronically offering the proposed reallocation to the entity.

20 Claims, 6 Drawing Sheets

(58) Field of Classification Search
USPC .......................................................... 320/137
See application file for complete search history.

(56) References Cited

U.S. PATENT DOCUMENTS

| | | | |
|---|---|---|---|
| 9,840,156 | B2 | 12/2017 | DeBoer, III |
| 10,217,160 | B2 | 2/2019 | Penilla et al. |
| 10,857,900 | B2 | 12/2020 | Uyeki et al. |
| 10,867,315 | B2 | 12/2020 | Uyeki |
| 2010/0134067 | A1* | 6/2010 | Baxter .................. B60L 3/0084 320/109 |
| 2013/0211988 | A1* | 8/2013 | Dorn ....................... B60L 53/65 700/297 |
| 2014/0062401 | A1* | 3/2014 | Gadh ...................... B60L 53/67 320/109 |
| 2017/0274792 | A1* | 9/2017 | Vaughan ................. B60L 53/18 |
| 2018/0001781 | A1* | 1/2018 | Quattrini, Jr. ......... B60L 53/665 |
| 2019/0139162 | A1 | 5/2019 | Sawada et al. |
| 2019/0263271 | A1 | 8/2019 | Ashby et al. |
| 2020/0175614 | A1 | 6/2020 | Fox et al. |
| 2020/0338999 | A1 | 10/2020 | Press et al. |
| 2021/0170903 | A1 | 6/2021 | Tsuchiya et al. |
| 2021/0213848 | A1 | 7/2021 | Sun |

OTHER PUBLICATIONS

Simorgh et al.; "Cost-Based Optimal Siting and Sizing of Electric Vehicle Charging Stations Considering Demand Response Programmes", IET Gener. Transm. Distrib., 2018, vol. 12 Iss. 8, pp. 1712-1720.

Said et al.; "Multi-priority Queuing for Electric Vehicles Charging at Public Supply Stations With Price Variation", Wireless Communications and Mobile Computing Wirel. Commun. Mob. Comput. 2015; 15:1049-1065.

Moradipari et al.; "Pricing and Routing Mechanisms for Differentiated Services in an Electric Vehicle Public Charging Station Network", arXiv:1903.06388v2 [cs.SY], Aug. 26, 2019, 12 pgs.

Mell, Peter, et al., "The NIST Definition of Cloud Computing", NIST Special Publication 800-145, Sep. 2011, Gaithersburg, MD, 7 pgs.

Zarkeshev, A., et al, "Charging reservation service for electric vehicles using automatic notification", retrieved on Nov. 2, 2021 from Internet URL: http:/real.mtak.hu/78823/1/4_19_u.pdf, 5 pgs.

Liu, H., et al., "Reserving Charging Decision-Making Model and Route Plan for Electric Vehicles Considering Information of Traffic and Charging Station", Apr. 25, 2018, retrieved on Nov. 2, 2021 from Internet URL: https://www.mdpi.com, 20 pgs.

* cited by examiner

ELECTRIC VEHICLE CHARGING RESERVATION TIMESLOT REALLOCATION

BACKGROUND

Electric vehicles are becoming increasingly popular and more widely put to use in both human-operated and self-driving implementations. The demand for efficiently-managed, rapid, on-demand EV charging has increased as a result. Varying EV charging standards exist that specify different charging technology levels. In general, a higher level corresponds to a greater supply or power (Ampere/Voltage/kilowatt). The charging times—the time it takes to charge an EV—vary accordingly. Based on current battery capacities and power delivery technology, it typically takes between 30 minutes to several hours to fully charge most EVs.

SUMMARY

Shortcomings of the prior art are overcome and additional advantages are provided through the provision of a computer-implemented method. The method determines, in connection with an electric vehicle (EV) traveling to a destination, arrival parameters of the EV to arrive at the destination and a charging requirement of the EV to reach the destination within the arrival parameters. The method also identifies one or more reserved charging reservation timeslots at one or more EV charging stations along a route to the destination that satisfy the arrival parameters and charging requirement of the EV. The method additional determines, at least in part using an AI model configured to determine reallocations of charging reservations at electric vehicle charging stations, a proposed reallocation of a reserved charging reservation timeslot of the one or more reserved charging reservation timeslots. The reserved charging reservation timeslot is owned by an entity, and the proposed reallocation includes a proposal for the entity to give up at least a portion of the reserved charging reservation timeslot to charge the EV. Further, the method electronically offers the proposed reallocation to the entity.

Further, a computer system is provided that includes a memory and a processor in communication with the memory, wherein the computer system is configured to perform a method. The method determines, in connection with an electric vehicle (EV) traveling to a destination, arrival parameters of the EV to arrive at the destination and a charging requirement of the EV to reach the destination within the arrival parameters. The method also identifies one or more reserved charging reservation timeslots at one or more EV charging stations along a route to the destination that satisfy the arrival parameters and charging requirement of the EV. The method additional determines, at least in part using an AI model configured to determine reallocations of charging reservations at electric vehicle charging stations, a proposed reallocation of a reserved charging reservation timeslot of the one or more reserved charging reservation timeslots. The reserved charging reservation timeslot is owned by an entity, and the proposed reallocation includes a proposal for the entity to give up at least a portion of the reserved charging reservation timeslot to charge the EV. Further, the method electronically offers the proposed reallocation to the entity.

Yet further, a computer program product including a computer readable storage medium readable by a processing circuit and storing instructions for execution by the processing circuit is provided for performing a method. The method determines, in connection with an electric vehicle (EV) traveling to a destination, arrival parameters of the EV to arrive at the destination and a charging requirement of the EV to reach the destination within the arrival parameters. The method also identifies one or more reserved charging reservation timeslots at one or more EV charging stations along a route to the destination that satisfy the arrival parameters and charging requirement of the EV. The method additional determines, at least in part using an AI model configured to determine reallocations of charging reservations at electric vehicle charging stations, a proposed reallocation of a reserved charging reservation timeslot of the one or more reserved charging reservation timeslots. The reserved charging reservation timeslot is owned by an entity, and the proposed reallocation includes a proposal for the entity to give up at least a portion of the reserved charging reservation timeslot to charge the EV. Further, the method electronically offers the proposed reallocation to the entity.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
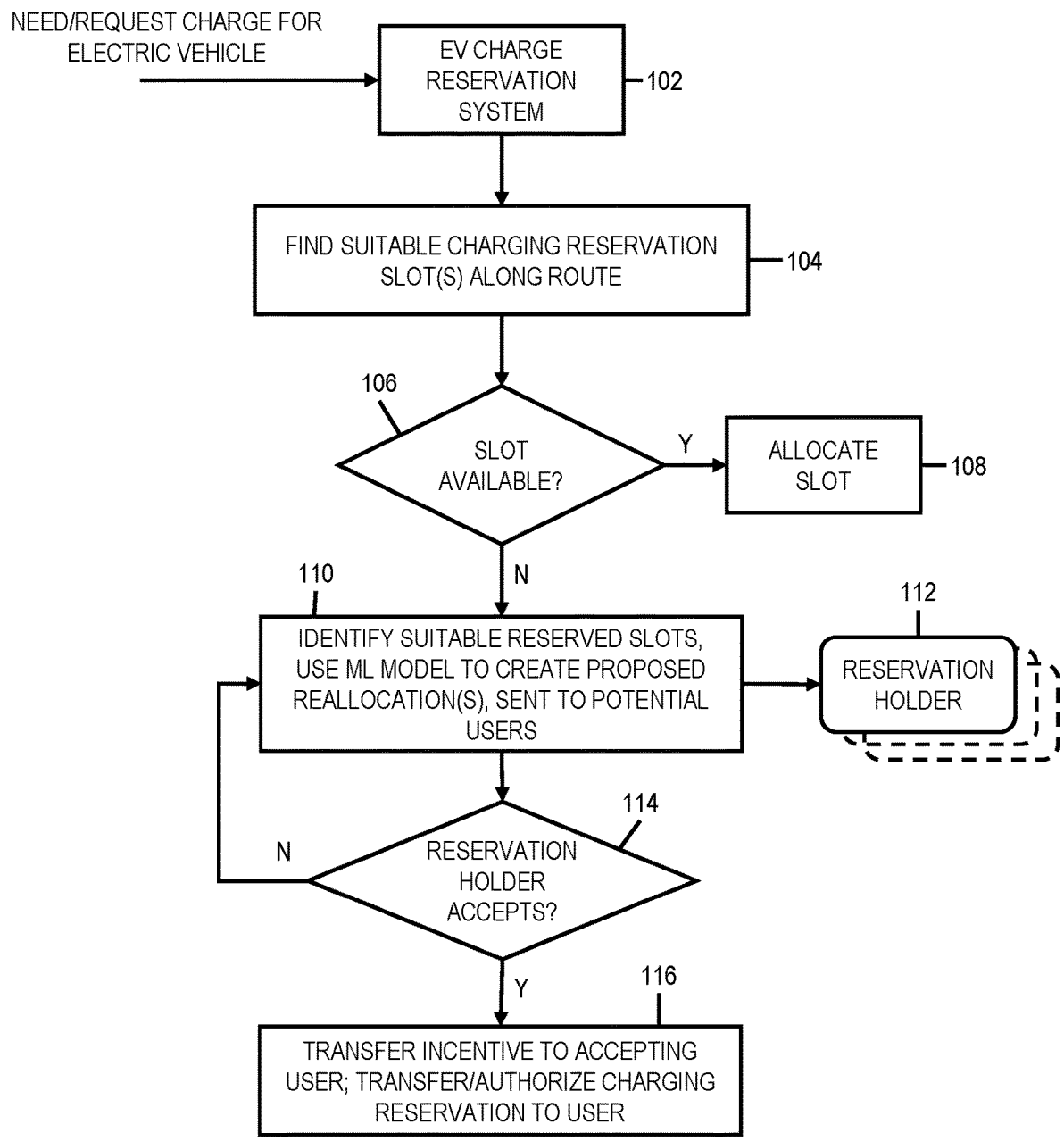
FIG. 1 depicts an example of charging timeslot reallocation, in accordance with aspects described herein.

Electric vehicles (EVs) are charged using EV chargers. Home EV chargers exist and provide conveniences to EV owners to charge their EVs at home. Public EV charging stations also exist where EV owners (individuals, companies) can charge their EVs, typically for a fee. Many EV charging stations operate much like traditional gas stations, i.e. on a first-come, first-served basis in which arriving EVs pull into a charging stall or space, charge the EV for a fixed or variable amount of time, pay a fee, then leave. It is also possible for EV charging stations to use a booking/reservation/prioritization system that allows entities to reserve a charging reservation timeslot during which to charge an EV. In a reservation system, an entity reserves a charging reservation timeslot with an EV charging station to provide a timeslot during which the EV charging station holds a guaranteed available space for the reserving entity.

EVs take longer to refuel (charge) than other types of vehicles. As a result, charge times to charge an EV are more likely to result in delays (arrival times, missed flights, missed delivery or pickup times, etc.) or other costs to the drivers and other stakeholders relying on the EV. For instance, delays with respect to EVs used in business applications can impact service level agreements (SLAs) that a business has with its customers. Further, the charge time to charge an EV a given amount of power and cost can vary significantly based on the type/technology of the charger and the EV involved. Charge time factors into potential delays in arrival as does time spent in a queue that may have formed at the EV charging station. The increase in demand for charging stations fueled by rising popularity of EVs, together with a lag in new charging station installation, has produced inefficiencies in EV charge management and prioritization.

In one aspect to improve conventional practice, a system could determine arrival times and arrival parameters of EVs, determine, efficiently and in a collaborative fashion, cost(s) associated with EVs failing to satisfy their arrival parameters (late arrival, missed SLA, etc.) due to charging requirements, determine cost(s) associated with offsetting/reallocating charging priorities for other EVs, and propose reallocations in which an entity gives up some or all of a reserved charging reservation timeslot for that entity's EV so that another entity's EV can use that relinquished timeslot (or portion thereof) to charge. In some aspects, the entity relinquishing some/all of a timeslot for charging can be compensated/incentivized to give up the timeslot, for instance though an offer of money, rewards, or other compensation.

Currently there are no existing EV charging reservation systems that take into account how a delay in charging an EV may impact the plans of the entity (driver/user/business) owning and using that EV. This impact might be much higher in terms of costs or other measures than the actual cost to charge the EV.

Aspects described herein can determine and propose reallocations of charging reservation timeslots. A reallocation in this sense is a change in the EV/entity to which a charging reservation timeslot, or portion thereof, is allocated or reserved. A proposed reallocation can incentivize one entity that previously reserved a timeslot (i.e., the owner of the reservation) to give up at least a portion of that timeslot to another entity/EV to charge during that relinquished timeslot/portion. This can provide benefits to entities seeking EV charging and/or faster charge times and also to entities with some flexibility in terms of charging requirements and scheduling that would allow them to charge later or at a different charging station, for instance. In examples, the entity relinquishing a timeslot or portion thereof to another entity is compensated, directly or indirectly, i.e. through an EV charging reservation system, by the another entity to whom the timeslot/portion thereof is being relinquished.

Additional aspects take into account EV charging station locations, scheduling timeslots at those EV charging stations, electronically accessing charging reservation timeslot data indicating availability of charging reservation timeslots, travel schedules of EVs, charging requirements of EV given specifics of the destination location(s), travel schedule, arrival parameters, and other route information, as well as EV battery and range information, charging technologies, and the logistics of routing EVs to other charging stations if it would provide a better outcome overall.

By way of specific example, aspects provide a system that determines a driver's travel schedule (or in the case of a driverless EV, a business travel schedule of the vehicle). The system also determines a charging requirement of the EV to, for instance, reach destination(s) within ascertainable arrival parameters such as arrival times, necessary routes, and others. The system further determines costs and/or other impacts associated with any delays in charging. There may be a cost to arriving late to an airport and missing a flight, and there may be a cost if a logistics company cannot deliver some packages on a guaranteed schedule (the company might need to pay on account of a missed SLA), as examples.

In accordance with further aspects, the system can determine proposed reallocations that are sufficiently high such that they are likely to attract an entity to accept the reallocation and relinquish a timeslot while minimizing additional unnecessary cost to the entity benefiting from the relinquished timeslot.

A charging reservation timeslot might have a duration defined by the EV charging station. For instance, an EV charging station might sell timeslots in 15-minute increments. It may be possible that one EV can use one portion of the timeslot (5 minutes) and another EV can use another portion of that timeslot (the remaining 10 minutes). Accordingly, a system can determine reallocations at a finer granularity than the timeslots increments offered by the charging station such that a partial reservation/timeslot can be relinquished by one EV in favor of another EV. A single reservation timeslot could thereby be shared by several (two or more) drivers/entities to provide each a partial charge. This may be useful in situations where the portion to each EV provides enough charge for the EV to reach its destination (satisfying its arrival parameters) where it might have access to another charge station experiencing less demand.

Effecting a transfer of a reservation from a reservation owner to another entity could be accomplished in any way desired, and may vary according to how the particular EV charging station at which the reservation is made controls its reservations. Some charging stations operate using limited use or one-time passcodes wherein an EV operator provides the code at an appropriate time for admittance into the facility or charging spot to charge. That code could be shared from one EV to another EV (perhaps via owner/operator or onboard computer devices and applications executing thereon). In some examples, a reservation owned by one entity could be updated to identify the other entity. In yet another example, double-authentication (e.g. Bluetooth and LIDAR camera sensor detection) can be used to establish device-to-device (mobile-to-mobile, vehicle-to-vehicle, etc.) communication between nearby devices for authentication or other purposes. For instance, an EV (or device of an owner/operator thereof) arriving at an EV charging station could communicate with another EV (or other device) located at that charging station to share travel schedule, charging requirement, arrival parameters, and/or other information enabling them to determine and agree on a charging reservation timeslot reallocation mutually agreeable to each, in which one entity is compensated in order to relinquish charging time to another entity.

FIG. 1 depicts an example of charging timeslot reallocation, in accordance with aspects described herein.

An EV charge reservation system 102, implemented by software executing on a computer system for instance, identifies a need or receives a request for charging of an EV. In one example, a user or other entity that owns or operates the EV requests a charge, explicitly or by way of a request based on information provided to the reservation system 102. The entity could provide arrival parameters and other information as part of the request. For instance, the entity could provide, as examples, a starting location and time, destination location, a time by which it is to reach the destination, an indication of criticality or purpose of the travel (indicative of a cost to the entity if unable to charge and reach the destination on time), and/or battery information such as battery percentage or range. Additionally or alternatively, the reservation system could request/obtain the forgoing information automatically from the EV, user device, or another device. In any case, the system can determine a travel schedule of the EV, for instance time(s) by which the EV is to arrive at destination(s), as well as charging requirements to meet or satisfy the travel schedule and arrival parameters.

The EV reservation system 102 could provide a reservation platform that enables users to make EV charging reservations at EV charge stations and is responsible for managing those reservations at EV charging stations. Additionally or alternatively, the EV reservation system 102 could link into existing such platform(s), for instance via application programming interfaces (API)s. In any case, there exists some way for an entity to reserve charging reservation timeslots, referring to specific windows of time during which the entity can charge the entity's EV at a given EV charging station. The reservation system 102 could manage reservations for, or communicate with systems to manage reservations for, multiple different EV charging stations.

The reservation system attempts to identify (104) suitable charging reservation timeslot(s) along a route that the EV is to travel as part of its travel schedule. In this regard, it could consider any one or more EV charging stations proximate the route, for instance any within a certain distance of the planned route or that is under some threshold amount of time off of the route. Whether a timeslot is suitable can be a function of the charging requirement for the EV, including how much charge is needed to ensure enough range to reach the destination(s) of the travel schedule, and the arrival parameters, including whether the EV would reach the destination(s) on time if it charges during the timeslot at the identified EV charging station. A process determines (106) whether such a charging reservation timeslot is available (not already reserved) and, if so (106, Y), allocates (108) the timeslot to the EV, for instance directly or by way of a request to whichever reservation platform is responsible for reservations at the identified EV charging station.

Otherwise (106, N), the reservation system 102 performs 110—identifying suitable reserved charging reservation timeslot(s), using an artificial intelligence (AI) model (also referred to as a machine learning or prediction model) to create proposed reallocation(s), and sending reallocation proposal(s) to one or more users/reservation holders 112. In examples, the AI model determines, for a given entity holding a reservation of a charging reservation timeslot suitable for the above EV and entity on behalf of which the reallocation is to be attempted, a compensation amount or value to offer to the holding entity in exchange for the timeslot (or a portion thereof) to use to charge the EV. A process can gather information about historical reallocations, including proposed, accepted, and rejected reallocations by holding entity/entities, and train an AI model using that gathered information. The AI model learns what entities accept in exchange for relinquishing reserved charging reservation timeslots (or portions thereof) in different situations and scenarios. It can also learn individual reservation holder preferences, including what individual entities are willing to accept as compensation in different situations and/or what they are willing to pay as compensation to takeover a reservation in different situations. The AI model can use this information to determine proposed reallocations specific to given reservation holders, and even identify reservation holders to target for the reallocation proposals.

The process inquires (114) whether any reservation holder receiving a proposed reallocation has accepted the reallocation. If not (114, N), the process returns to 110 to perform again aspects of 110, for instance modifying proposed reallocations (to increase the compensation offered, for instance) and/or to target other reservation holders of suitable timeslots, as examples. Additionally or alternatively, the system could consider additional/other EV charge stations. The particular EV charge stations to check for suitable timeslots can be based on specified and/or learned entity preferences and EV charge capabilities, such as charge level and plug style, as examples.

If instead a reservation holder accepts a proposed reallocation offered to it (114, Y), the process at 116 transfers an incentive to the accepting entity and transfers/authorizes the charging reservation timeslot (or portion thereof) to the entity on behalf of which the reallocation is being attempted. An incentive could be monetary compensation, for instance an amount of cryptocurrency or other currency drawn from a prepaid account, an online money transfer platform, or other payment portal of the entity on behalf of which the reallocation is made, an into an account of the entity accepting the proposed reallocation.

In some examples, any reallocation proposed on behalf of an entity needing a timeslot must be prior-approved by that entity or is also presented to that entity (in addition to a reservation-holding entity) for acceptance of rejection. In these situations, the reallocation is effected only if both entities accept the proposed reallocation.

A specific example of aspects described herein is now provided for convenience and without limitation. Assume individual A is driving in electric vehicle A (EV_A) to an airport 40 miles away and EV_A has only 30 more miles of range based on its current battery charge. A has a scheduled flight at the airport and must arrive at the airport within the next two hours (120 minutes) to make the flight. The 40-mile drive to the airport from the current location of EV_A will take 45 minutes. The foregoing provide, at least in part, arrival parameters for A's travel schedule and a charging requirement for EV_A to meet these parameters. In this scenario, EV_A will not reach the airport without some additional charge because its range is 10 miles less than the distance to the airport. Additionally, A has only 75 minutes to spare for charging EV_A. It can be determined that there are two EV fast-supercharging stations—station 1 (20 miles away) and station 2 (25 miles away), and each station offers 15-minute charge timeslots that would provide EV_A 100 miles additional range (enough to reach the airport on time). However, based on existing demand/reservations at stations 1 and 2, there is currently a 90-minute wait time at each station with EVs waiting to charge.

An EV reservation system (e.g. 102) parametrizes A's schedule, for instance based on calendar information and flight information automatically ascertained from A's smartphone applications/data or based on A supplying this information. Statistical models can then be applied to assess the impact(s) to A. In a specific example, gathered information about A'travel schedule is provided to a tokenization module where Latent Dirichlet Allocation (LDA) is run for topic modeling using TF-IDF (Term Frequency—Inverse Document Frequency) to determine relevant information (countvectorizer function—convert a collection of text documents to a vector of term/token counts) identifying that if A does not reach the airport by the two-hour arrival parameter, A will miss the flight. It can also determine which charging reservation timeslots would be suitable for A and EV_A, for instance the timing, duration, and capabilities. It might identify that a timeslot for regular supercharging (as opposed to fast supercharging) is insufficient.

The system can proceed based on what is determined by the foregoing to determine reallocation(s) that, if accepted, would satisfy the arrival parameters and charging requirements of A. A model can offer/negotiate reallocations, including incentives, with other entities/EVs by initiating communications via an ad-hoc scatter network, WiFi, Bluetooth, piconet, or other communications, for instance, with other vehicles/entity devices. In examples, the communication is made in the vicinity of the EV charge station(s) with EVs that already have a pending reservation. In some examples, reservations are allocated to EVs themselves in which case EV_A might take over a reservation of another EV.

A system facilitating the semi-autonomous capabilities a vehicle can take advantage of LIDAR and a region based convolutional neural network (R-CNN) algorithm in order to (i) confirm and ensure, to the EV station and/or receiving entity of a timeslot, the identification of the EV and/or owning entity that is giving up the timeslot and (ii) confirm and ensure, to the EV station and/or entity relinquishing the timeslot, the identification of the EV and/or owning entity that is receiving the timeslot. This provides for double-authentication and verification, facilitating easy identification of the timeslot relinquishing and receiving entities to each other and preventing an unrelated party from spoofing either identity. In a particular example, a reservation server with information about the charging queue, for instance a list/table reflecting which EVs/entities at the EV charging station have which reservation timeslots, can be used to acknowledge the EVs in the vicinity, matching them to a to list/table. For example, if three EVs are waiting for a particular charging space and the second of those EVs in line is the one that receives the timeslot corresponding to that space, the above can be used to direct and authorize the EV accordingly to enter the space as the vacating EV vacates the space and thus prevent another EV from entering into that space.

As an example reallocation proposal, a reservation system could offer $10 to any of the first cars in a queue at both EV charging stations mentioned above, since any of the timeslots would satisfy the requirements for A's travel schedule. Other entities that participate in the reservation system can configure settings to automatically accept reallocations of their reserved timeslots when the associated incentives are above a certain amount of compensation and when relinquishing a reserved timeslot would not negatively impact their travel plans. The reservation system could send notifications of the proposed reallocation to target entities that hold reservations compatible with the charging requirements and arrival parameters of the entity in need of a charge. The notification can be sent to mobile devices or EVs of the target entities which display a pop-up offer and message indicating that another entity is offering a proposed reallocation (indicating the compensation offered) to the target entity if the target entity gives up its current reservation. Additionally, the system can also automatically identify an alternative timeslot for the target entity before or after the target entity accepts the reallocation. The reservation system could provide as part of the reallocation an indication that the next available reservation is X number of minutes later and that accepting the reallocation will not affect any of the target entity's scheduled appointments. The target entity can then accept or reject the proposed reallocation. There may an amount of time after which the offer of the proposed reallocation expires. If a target entity accepts, an authorization of the requesting entity/EV to use the timeslot can be electronically communicated to the appropriate destinations. This can vary depending on how reservations are confirmed, redeemed, or managed. For instance, some EV charging stations admit EVs based on a reservation code in which case the reservation code for the reallocated timeslot could be automatically sent to the requesting entity/EV so that on arrival of the EV to the EV charging station a system of the charging station can automatically authenticate the EV for use with the timeslot. In other examples, a reservation system (such as reservation system 102 or another reservation system) maintains detailed information about EVs with reserved timeslots and a reallocation is effected by another system dictating a change to an existing reservation to change the existing reservation to reflect the requesting EV rather than the relinquishing EV.

As another specific example of aspects described herein, assume entity B is traveling in EV_B on a trip with three stops but the current battery level of EV_B is too low to reach the first of the three destinations without a charge. B secures a 30-minute charging reservation timeslot at a nearby EV charging station to charge EV_B on the way to the first stop. Since the EV charging station is in an area of high demand, there are many other drivers waiting to charge and the wait time for new reservations is two hours.

The reservation system is able to determine that ten minutes of charge time would charge EV_B enough to reach the first stop and the first stop has a charging station. In these circumstances, B could give up a portion of B's 30-minute charging reservation timeslot, specifically up to 20 minutes of the 30-minute timeslot. Entity B could relinquish up to 20 minutes of the timeslot and the demand for a timeslot at this EV charging station is high enough that other drivers are offering proposed reallocations in order to charge timeslot or portion thereof. Accordingly, the reservation system notifies B of a proposed reallocation for 20 minutes or less of B's timeslot, and B accepts the offer to relinquish the remaining 20 minutes to another EV to charge. B is nonetheless able to reach its first destination on time and charge while there. Both entities satisfy their arrival parameters and charging requirements to meet those parameters in this situation.

Accordingly, aspects provide cognitive reallocation of charging reservation timeslots. An EV owner and/or a reservation system can initiate and propose reallocation for possible acceptance in order to reallocating charging timeslot(s) between entities. Aspects focus on charging requirements, priority, travel schedules, and cognitive reallocation/rescheduling.

Figure 2:
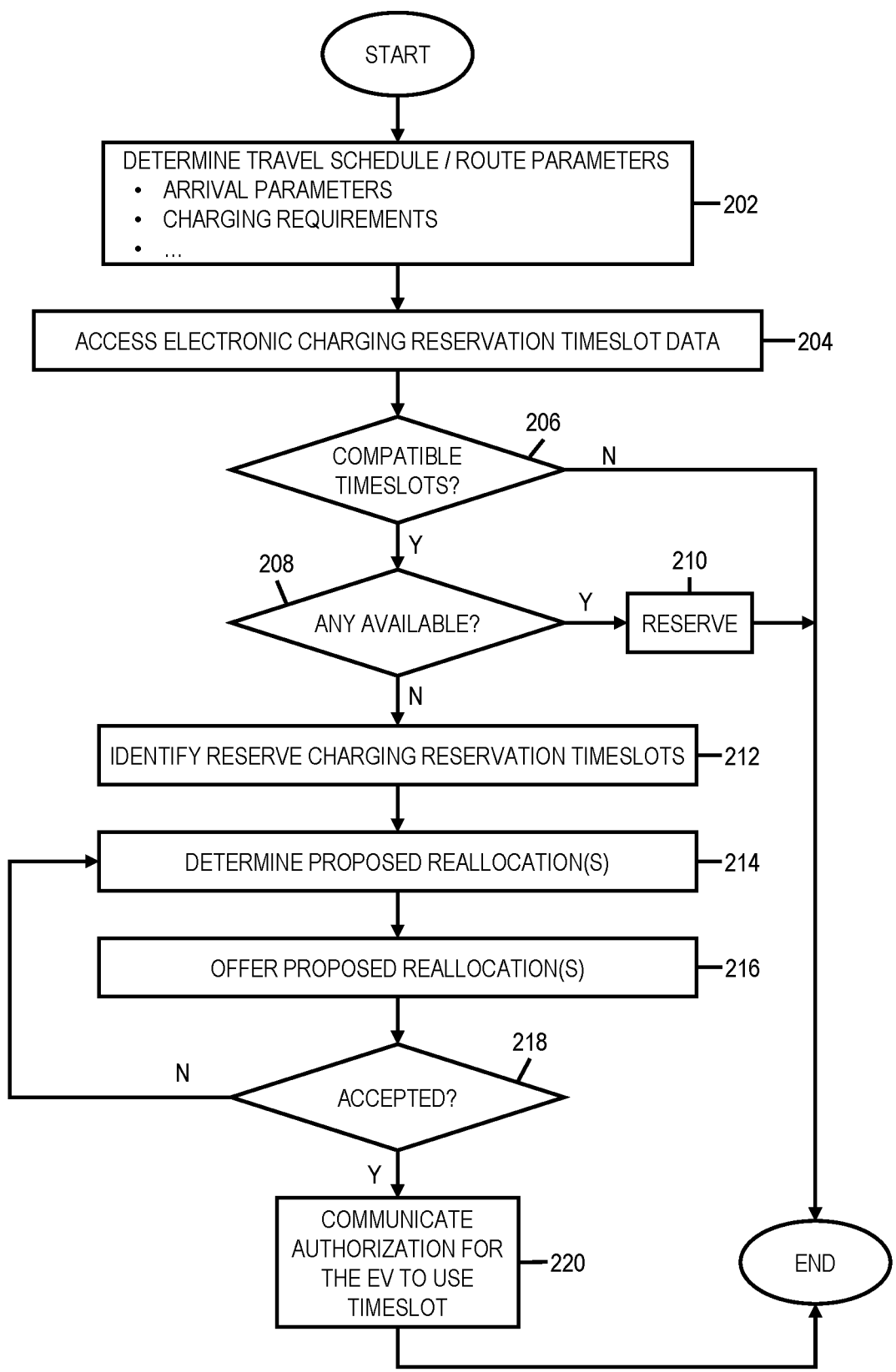
FIGS. 2-3 depict example processes for charging timeslot reallocation, in accordance with aspects described herein.
Figure 3:
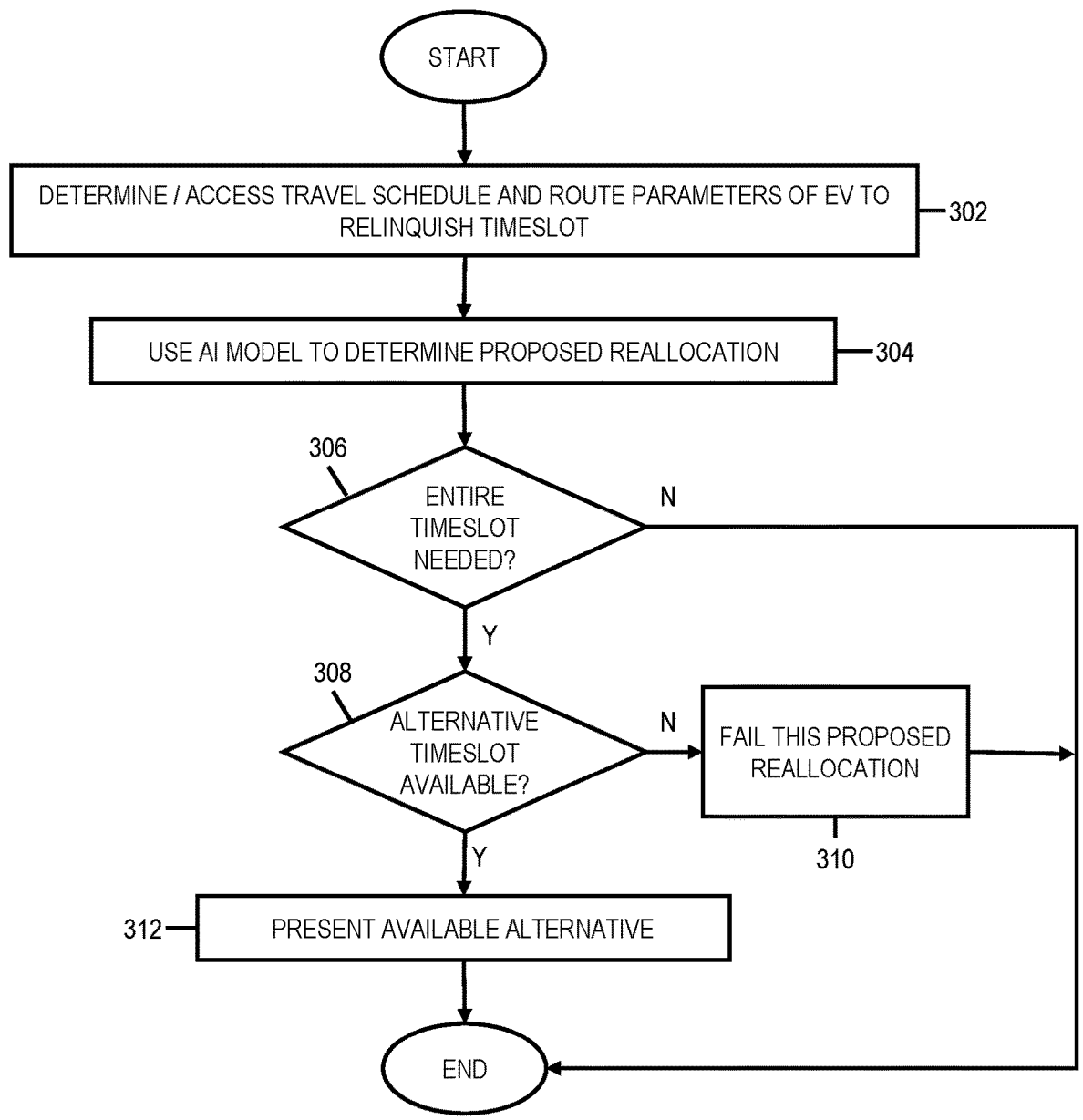

FIGS. 2-3 depict example processes for charging timeslot reallocation, in accordance with aspects described herein. In some examples, the process is performed by one or more computer systems, such as a reservation system or other computer system(s), which may be or include one or more cloud servers in examples.

Referring initially to FIG. 2, the process determines (202) travel schedule/route parameters in connection with a subject electric vehicle (EV) traveling to a destination. For instance, it determines arrival parameters of the subject EV to arrive at the destination. Example arrival parameters include any parameters relating to arrival of the subject EV at the destination and/or any intervening stops/destinations on route, including any anticipated or required timeframe(s) for arrival, information informing of travel delays, route information such as distance, traffic conditions, or the like. The process can also determine a charging requirement of the subject EV to reach the destination (and/or intervening stops) within the arrival parameters. It may be that the EV has sufficient charge to reach the destinations (which could encompass a charge requirement to reach a final destination where there is a charge station). Charging parameters include charge level(s) and times and durations of charge that may be needed to arrive within the arrival parameters. By way of example, the process could determine that the subject EV must arrive within 120 mins to a destination and because the subject EV has 10% battery it will need to stop within the next 40 minutes/85 miles and charge for at least 15 minutes in order to reach the destination on time. The subject EV is owned/controlled/driven by a subject entity, such as a user or a company that operates the subject EV as an autonomous vehicle.

The process also accesses (204) electronic charging reservation timeslot data indicating charging reservation timeslots at one or more EV charging stations and determines (206) whether any of these charging reservation timeslots are compatible, i.e. satisfy the arrival parameters and charging requirement of the subject EV (i.e. are compatible). If not (206, N) the process ends, as no timeslots, even if not reserved, would satisfy what is needed for the subject EV to arrive on time. Otherwise (206, Y), the process determines (208) whether any of the compatible timeslot(s) are currently available, i.e. unreserved. If a compatible timeslot is available and unreserved, then the process reserves (210) the timeslot in favor of the subject EV and ends. In this case, no reallocation is needed because the subject EV can charge during the available timeslot and reach the destination within the arrival parameters. After the process ends, the reservation may need to be finalized outside of the reservation system, for instance in a mobile application or other platform used by the EV charging station, as an example.

If, however, none of the compatible timeslots are available/unreserved (208, N), then the process can proceed to attempt to determine reallocation(s) of charging reservation timeslots to propose to target entities that hold reservations to change their EVs (target EVs). Thus, the process identifies (212) one or more reserved charging reservation timeslots at one or more EV charging stations along a route to the destination that satisfy the arrival parameters and charging requirement of the EV. This identifies timeslots, currently reserved, that would satisfy the subjects EV's needs in terms of charging requirement and arrival parameters. One or more of these timeslots can be selected for possible reallocation. The process of FIG. 2 proceeds to determine (214) proposed reallocation(s) (an example process for which is provided by FIG. 3) and electronically offer (216) the proposed reallocations to one or more target entities. The determination and offer of proposed reallocation(s) can therefore be performed on the basis of having determined at 208 that only unavailable (reserved) charging reservation timeslots exist at the EV charging station(s) that satisfy the arrival parameters and charging requirement of the EV.

A proposed reallocation could be determined for each of one or more identified timeslots. Since reservation holders are not required to relinquish their timeslot, it may take offering multiple proposed reallocations, with progressively greater incentive, to the same or different target entities before a target entity accepts a proposed reallocation. Further, whether to propose a reallocation to a target entity could be a function of whether an alternative timeslot for the target entity to use is available and compatible with the travel schedule, arrival parameters, charging requirements, or the like of that target entity.

The determination of the proposed reallocation(s) (214) can be accomplished by invoking the processing of FIG. 3 to 'build' reallocation offer(s). The determining (214) can be performed at least in part using an AI model configured to determine reallocations of charging reservations at electric vehicle charging stations. The reserved charging reservation timeslot proposed for reallocation is owned by an entity (target entity) in the sense that the target entity is currently the owner/holder of the reservation of that timeslot to charge a target EV. The proposed reallocation includes a proposal for the target entity to give up at least a portion of the reserved charging reservation timeslot to give way to charging the subject EV.

The process, in determining proposed reallocation(s), can determine whether to electronically offer a proposed reallocation to the target entity in the first place, for instance based on determining costs involved. The proposed reallocation can include a predicted/determined amount to compensate the target entity as part of the proposed reallocation. If that cost is less than a cost to the subject entity in not meeting the arrival parameters, based on the charging requirement and a delay in charging the EV due to lack of availability of charging reservation timeslots at the EV charging station(s), then the proposed reallocation would make sense to the subject entity and the reallocation can be proposed to the target entity. Otherwise, the process could determine and potentially propose another reallocation. After electronically offering one or more proposed reallocations, the process determines (218) whether any were accepted. If so, (218, Y) the process electronically communicates (220 an authorization of the subject EV to use the at least a portion of the charging reservation timeslot to charge the subject EV. For instance, the process electronically provides some authorization like a reservation code, passcode, token, or the like, to the subject EV or interacts with an EV station reservation system/platform to change the reservation from the target EV to the subject EV.

If no proposed reallocation was accepted (218, N), the process returns to determine (additional) proposed allocation(s), for instance to propose reallocation(s) to other entities and/or update a previously proposed reallocation that was not accepted (by increasing the compensation offered, for instance).

In addition, the AI model used in determining reallocations to propose can be trained over time based on feedback provided from acceptances and rejections of proposed reallocations. The acceptance/rejection provides labeled training data useful in conjunction with the relevant characteristics and parameters ('input features') of the situation giving rise to the proposed reallocation that was accepted or rejected. This feedback can be saved/stored and used in further training of the AI model. In this manner, a process can initially build and train the AI model, and then the AI model can be refined and trained over time using feedback provided in the form of labeled training data saved from acceptance/nonacceptance of proposed reallocations.

The relocation determination and offer can be repeated for one or more entities each owning a respective reserved charging reservation timeslot. And depending on whether any proposed reallocation offered to an entity is accepted, the process might determine additional reallocation(s) to proposed. Thus, one or more proposed reallocations might be sent initially to one of more entities, and then a determination can be made as to whether to send additional proposed reallocation(s) to the same and/or other entities.

FIG. 3 depicts an example process for determining a proposed reallocation to offer to a target entity holding a reserved charging reservation timeslot for the target entity's EV (target EV). The process accesses (302) a travel schedule and route parameters of the target EV and determines that reallocating the reserved charging reservation timeslot to give up at least a portion to charge the subject EV is compatible with the travel schedule of the target EV and a charging requirement of the target EV. The process then uses (304) the AI model to determine a proposed reallocation. The process determines a length of time of the at least a portion of the reserved charging reservation timeslot (i.e. determines that a whole or partial timeslot needed for the subject EV) and uses the AI model to determine an amount to compensate the target entity as part of the proposed reallocation. The process determines (306) whether the charging requirement of subject EV indicates that the entire reserved timeslot is needed. If not, the process ends, returning to FIG. 2 #216 to offer the proposed reallocation as the timeslot could be shared between the subject EV and the target EV. Otherwise, the requirement of the subject EV is such that the entire timeslot is needed and so the process, in an effort to reschedule the target EV for another timeslot if available, determines (308), e.g. from the electronic charging reservation timeslot data (e.g. FIG. 2 #204) whether an alternative charging reservation timeslot is available to the target EV to charge the target EV and whether it is compatible with a travel schedule and charging requirement of the target EV. If not (308, N), the process fails (310) the proposed allocation and ends, for instance to return to FIG. 2 and again perform FIG. 2 #214 to determine a next reallocation to propose). Otherwise, there is an alternative timeslot for the target EV and the process presents (312) the determined alternative charging reservation timeslot to the target entity as an alternative to the reserved charging reservation timeslot currently held by that entity. In examples, the alternative is presented when presenting the proposed reallocation to the target entity so that the target entity can conveniently see that a suitable alternative timeslot is available. The process of FIG. 3 then ends to return to FIG. 2, for instance to 216 to offer the proposed reallocation.

Although various examples are provided, variations are possible without departing from a spirit of the claimed aspects.

Figure 4:
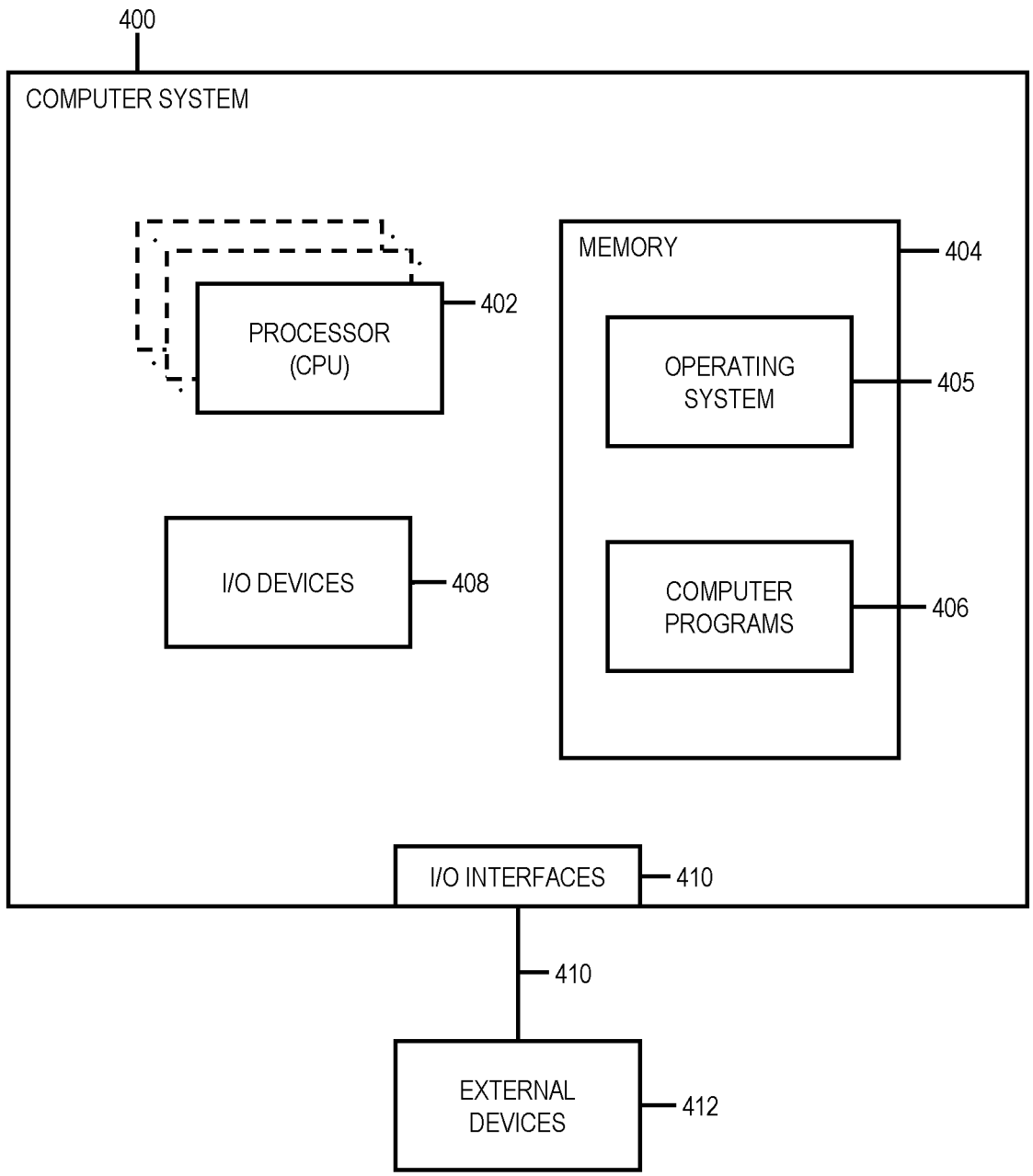
FIG. 4 depicts one example of a computer system and associated devices to incorporate and/or use aspects described herein.

Processes described herein may be performed singly or collectively by one or more computer systems, such as one or more computer systems for reserving, managing, or controlling charging reservation timeslot reservations and allocations. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
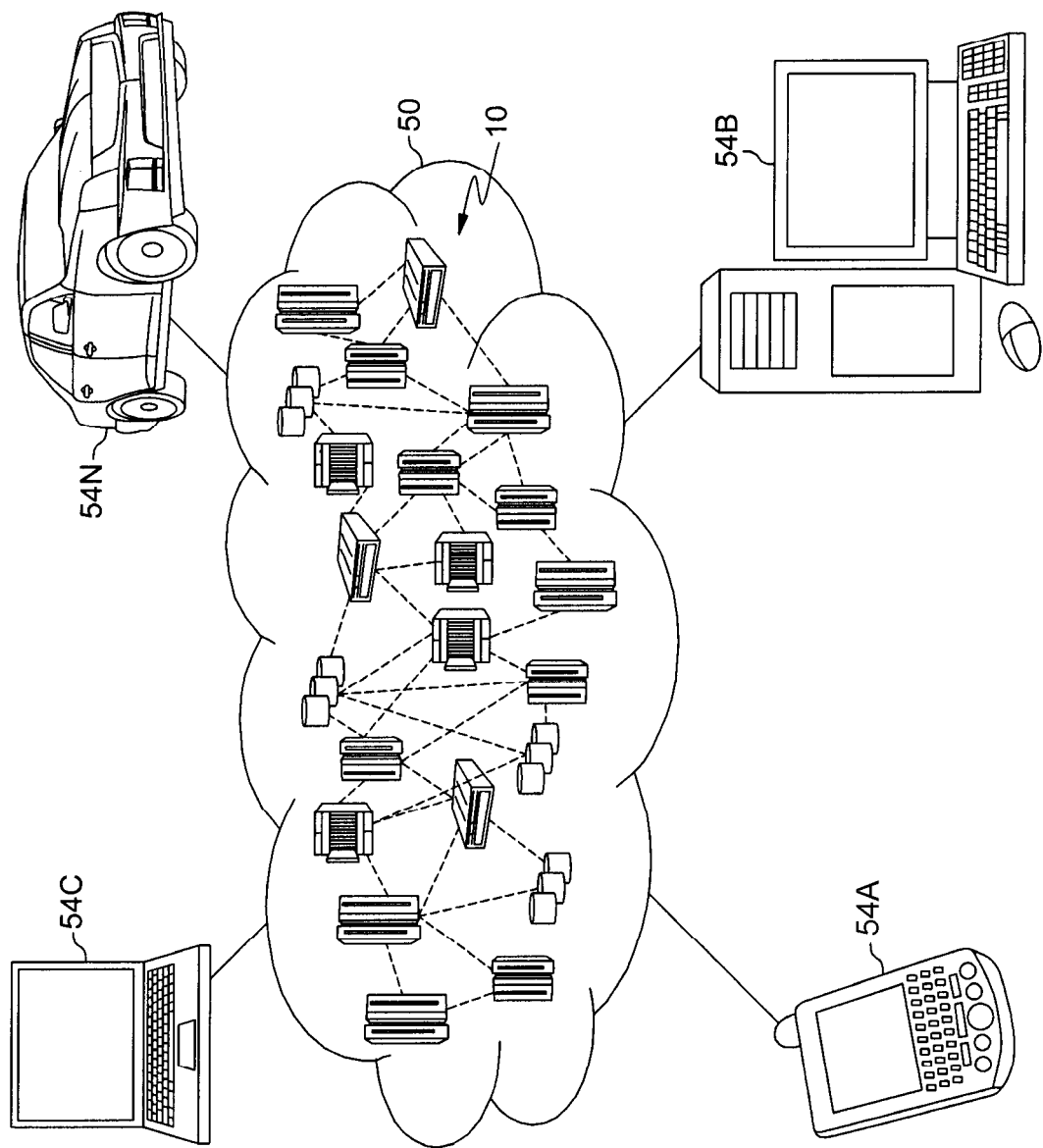
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
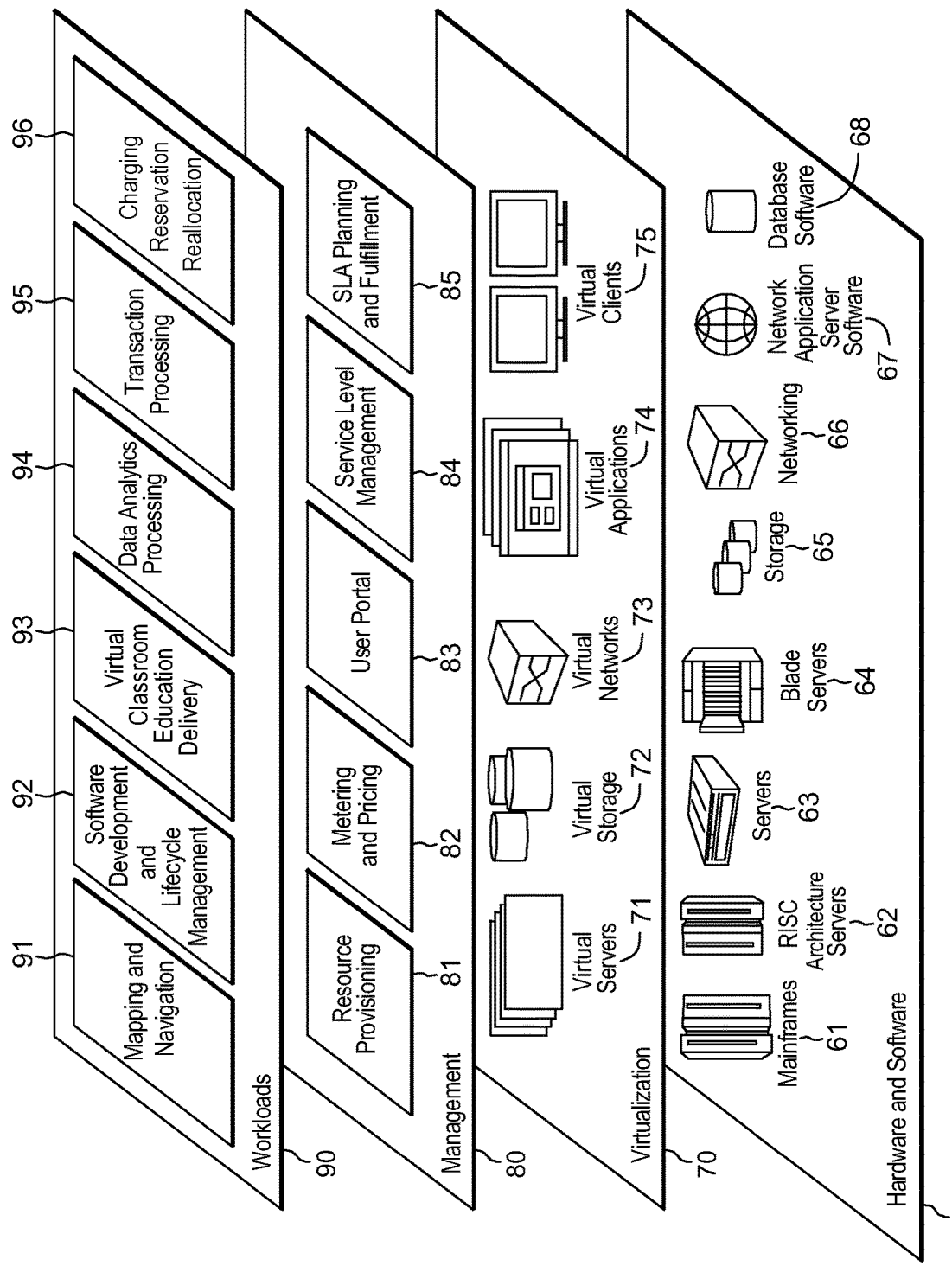
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and charging timeslot reallocation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   determining, in connection with an electric vehicle (EV) traveling to a destination, arrival parameters of the EV to arrive at the destination and a charging requirement of the EV to reach the destination within the arrival parameters;
   identifying one or more reserved charging reservation timeslots at one or more EV charging stations along a route to the destination that satisfy the arrival parameters and charging requirement of the EV;

determining, at least in part using an AI model configured to determine reallocations of charging reservations at electric vehicle charging stations, a proposed reallocation of a reserved charging reservation timeslot of the one or more reserved charging reservation timeslots, the reserved charging reservation timeslot owned by an entity, and the proposed reallocation comprising a proposal for the entity to give up at least a portion of the reserved charging reservation timeslot to charge the EV; and electronically offering the proposed reallocation to the entity.

2. The method of claim 1, wherein the EV is a first EV, wherein the reserved charging reservation timeslot is reserved for a second EV, the second EV controlled by the entity, wherein the method further comprises accessing a travel schedule of the second EV and determining that reallocating the reserved charging reservation timeslot to give up the at least a portion to charge the first EV is compatible with the travel schedule of the second EV and a charging requirement of the second EV.

3. The method of claim 2, wherein the proposed reallocation comprises a relinquishment of the reserved charging reservation timeslot to the first EV, and wherein the method further comprises:
   accessing electronic charging reservation timeslot data indicating availability of charging reservation timeslots;
   determining from the electronic charging reservation timeslot data an alternative charging reservation timeslot that is available to the second EV to charge the second EV and that is compatible with the travel schedule of the second EV and charging requirement of the second EV; and
   presenting the determined alternative charging reservation timeslot to the entity as an alternative to the reserved charging reservation timeslot.

4. The method of claim 1, further comprising based on electronic acceptance of the proposed reallocation by the entity, electronically communicating an authorization of the EV to use the at least a portion of the charging reservation timeslot to charge the EV.

5. The method of claim 1, wherein the identifying the one or more reserved charging reservation timeslots is performed as part of determining whether any charging reservation timeslots exist at the one or more EV charging stations that satisfy the arrival parameters and charging requirement of the EV, and wherein the determining and electronically offering the proposed reallocation is performed based on determining that only reserved charging reservation timeslots exist at the one or more EV charging stations that satisfy the arrival parameters and charging requirement of the EV.

6. The method of claim 1, further comprising based on nonacceptance of the proposed reallocation by the entity, providing an indication of the nonacceptance as labeled training data to train the AI model.

7. The method of claim 1, further comprising repeating, for each other entity of one or more other entities owning a respective other reserved charging reservation timeslot, the determining a proposed reallocation and the electronically offering the proposed reallocation.

8. The method of claim 1, wherein determining the proposed reallocation comprises determining a length of time of the at least a portion of the reserved charging reservation timeslot, and wherein using the AI model in determining the proposed reallocation uses the AI model to determine an amount to compensate the entity as part of the proposed reallocation.

9. The method of claim 8, further comprising determining to electronically offer the proposed reallocation to the entity based on the determined amount to compensate as part of the proposed reallocation being less than a cost associated with the EV failing to satisfy the arrival parameters based on the charging requirement and a delay in charging the EV due to lack of availability of charging reservation timeslots at the one or more EV charging stations.

10. The computer program product of claim 1, wherein determining the proposed reallocation comprises determining a length of time of the at least a portion of the reserved charging reservation timeslot, and wherein using the AI model in determining the proposed reallocation uses the AI model to determine an amount to compensate the entity as part of the proposed reallocation.

11. A computer system comprising:
   a memory; and
   a processor in communication with the memory, wherein the computer system is configured to perform a method comprising:
      determining, in connection with an electric vehicle (EV) traveling to a destination, arrival parameters of the EV to arrive at the destination and a charging requirement of the EV to reach the destination within the arrival parameters;
      identifying one or more reserved charging reservation timeslots at one or more EV charging stations along a route to the destination that satisfy the arrival parameters and charging requirement of the EV;
      determining, at least in part using an AI model configured to determine reallocations of charging reservations at electric vehicle charging stations, a proposed reallocation of a reserved charging reservation timeslot of the one or more reserved charging reservation timeslots, the reserved charging reservation timeslot owned by an entity, and the proposed reallocation comprising a proposal for the entity to give up at least a portion of the reserved charging reservation timeslot to charge the EV; and
      electronically offering the proposed reallocation to the entity.

12. The computer system of claim 11, wherein the EV is a first EV, wherein the reserved charging reservation timeslot is reserved for a second EV, the second EV controlled by the entity, wherein the method further comprises accessing a travel schedule of the second EV and determining that reallocating the reserved charging reservation timeslot to give up the at least a portion to charge the first EV is compatible with the travel schedule of the second EV and a charging requirement of the second EV.

13. The computer system of claim 12, wherein the proposed reallocation comprises a relinquishment of the reserved charging reservation timeslot to the first EV, and wherein the method further comprises:
   accessing electronic charging reservation timeslot data indicating availability of charging reservation timeslots;
   determining from the electronic charging reservation timeslot data an alternative charging reservation timeslot that is available to the second EV to charge the second EV and that is compatible with the travel schedule of the second EV and charging requirement of the second EV; and presenting the determined alternative charging reservation timeslot to the entity as an alternative to the reserved charging reservation timeslot.

14. The computer system of claim 11, wherein the method further comprises based on electronic acceptance of the proposed reallocation by the entity, electronically communicating an authorization of the EV to use the at least a portion of the charging reservation timeslot to charge the EV.

15. The computer system of claim 11, wherein the method further comprises based on nonacceptance of the proposed reallocation by the entity, providing an indication of the nonacceptance as labeled training data to train the AI model.

16. The computer system of claim 11, wherein determining the proposed reallocation comprises determining a length of time of the at least a portion of the reserved charging reservation timeslot, and wherein using the AI model in determining the proposed reallocation uses the AI model to determine an amount to compensate the entity as part of the proposed reallocation.

17. A computer program product comprising:
a computer readable storage medium readable by a processing circuit and storing instructions for execution by the processing circuit for performing a method comprising:
  determining, in connection with an electric vehicle (EV) traveling to a destination, arrival parameters of the EV to arrive at the destination and a charging requirement of the EV to reach the destination within the arrival parameters;
  identifying one or more reserved charging reservation timeslots at one or more EV charging stations along a route to the destination that satisfy the arrival parameters and charging requirement of the EV;
  determining, at least in part using an AI model configured to determine reallocations of charging reservations at electric vehicle charging stations, a proposed reallocation of a reserved charging reservation timeslot of the one or more reserved charging reservation timeslots, the reserved charging reservation timeslot owned by an entity, and the proposed reallocation comprising a proposal for the entity to give up at least a portion of the reserved charging reservation timeslot to charge the EV; and
  electronically offering the proposed reallocation to the entity.

18. The computer program product of claim 17, wherein the EV is a first EV, wherein the reserved charging reservation timeslot is reserved for a second EV, the second EV controlled by the entity, wherein the method further comprises accessing a travel schedule of the second EV and determining that reallocating the reserved charging reservation timeslot to give up the at least a portion to charge the first EV is compatible with the travel schedule of the second EV and a charging requirement of the second EV.

19. The computer program product of claim 18, wherein the proposed reallocation comprises a relinquishment of the reserved charging reservation timeslot to the first EV, and wherein the method further comprises:
  accessing electronic charging reservation timeslot data indicating availability of charging reservation timeslots;
  determining from the electronic charging reservation timeslot data an alternative charging reservation timeslot that is available to the second EV to charge the second EV and that is compatible with the travel schedule of the second EV and charging requirement of the second EV; and
  presenting the determined alternative charging reservation timeslot to the entity as an alternative to the reserved charging reservation timeslot.

20. The computer program product of claim 17, wherein the method further comprises based on nonacceptance of the proposed reallocation by the entity, providing an indication of the nonacceptance as labeled training data to train the AI model.

* * * * *